US009617070B1

(12) United States Patent
Russell et al.

(10) Patent No.: US 9,617,070 B1
(45) Date of Patent: Apr. 11, 2017

(54) SUPPLEMENTAL LID FOR CONTAINMENT SUMP

(71) Applicants: David D. Russell, Blodgett, MO (US); Robert Russell, Sikeston, MO (US)

(72) Inventors: David D. Russell, Blodgett, MO (US); Robert Russell, Sikeston, MO (US)

( * ) Notice: Subject to any disclaimer, the term of this patent is extended or adjusted under 35 U.S.C. 154(b) by 0 days.

(21) Appl. No.: 14/859,458

(22) Filed: Sep. 21, 2015

(51) Int. Cl.
*E02D 29/12* (2006.01)
*B65D 90/10* (2006.01)
*B65D 90/48* (2006.01)
*B65D 51/16* (2006.01)
*B65D 53/00* (2006.01)

(52) U.S. Cl.
CPC ....... *B65D 90/105* (2013.01); *B65D 51/1644* (2013.01); *B65D 53/00* (2013.01); *B65D 90/48* (2013.01)

(58) Field of Classification Search
CPC .... B65D 51/1644; B65D 53/00; B65D 90/48; B65D 90/105
USPC ................... 404/25, 26; 52/19, 20
See application file for complete search history.

(56) References Cited

U.S. PATENT DOCUMENTS

| | | | |
|---|---|---|---|
| 1,570,974 A | 1/1926 | Stevens | |
| 1,796,159 A | 3/1931 | Pallady | |
| 2,944,842 A | 7/1960 | Stiff | |
| 3,294,000 A * | 12/1966 | Pelsue | E02D 29/12 404/25 |
| 4,685,585 A | 8/1987 | Robbins | |
| 4,884,709 A | 12/1989 | McCarthy | |
| 5,046,886 A * | 9/1991 | Muir | E01F 13/02 404/25 |
| 5,052,216 A | 10/1991 | Sharp | |
| 5,062,735 A * | 11/1991 | Gaudin | E02D 29/14 210/164 |
| 5,236,228 A | 8/1993 | Lawton | |
| 5,425,466 A | 6/1995 | Bambacigno | |
| 5,437,482 A | 8/1995 | Curtis | |
| 5,492,373 A | 2/1996 | Smith | |
| 5,718,460 A | 2/1998 | Glunt et al. | |
| 6,024,243 A | 2/2000 | Palazzo | |
| 6,161,984 A * | 12/2000 | Sinclair | E02D 29/1427 404/25 |
| 6,685,570 B2 | 2/2004 | Zilberman et al. | |
| 6,712,403 B1 | 3/2004 | Dusevic | |
| 6,722,707 B1 | 4/2004 | Schurmann et al. | |
| 6,887,012 B1 * | 5/2005 | Zappe | E02D 29/149 404/25 |
| 7,171,994 B1 * | 2/2007 | O'Brien | B65D 90/24 141/311 A |
| 7,559,845 B2 | 7/2009 | Corey | |
| 7,607,858 B1 * | 10/2009 | Mosholder | E02D 29/1427 404/25 |

(Continued)

*Primary Examiner* — Raymond W Addie
(74) *Attorney, Agent, or Firm* — Haugen Law Firm PLLP

(57) ABSTRACT

An apparatus and method for providing a water impenetrable barrier between an underground duct and an access opening. The apparatus is particularly well suited to cover a secondary opening in a containment sump of an underground storage tank or the manway of a sanitary sewer, catch basin or other manhole system. The apparatus includes a lid, inflatable seal and pressurized tank contained within the lid to inflate the seal. When sealed to the access opening, the lid restricts the inflow of water or other debris into the interior of the underground duct and restricts removal of the lid.

18 Claims, 6 Drawing Sheets

(56) References Cited

U.S. PATENT DOCUMENTS

| | | | |
|---|---|---|---|
| 7,748,927 B2 * | 7/2010 | Neathery | E02D 29/14 404/25 |
| 8,033,581 B2 | 10/2011 | Crouse | |
| 8,091,194 B2 | 1/2012 | Clatot | |
| 8,360,679 B2 * | 1/2013 | Banks | E02D 29/14 404/25 |
| 8,770,889 B2 | 7/2014 | Sharp | |
| 2007/0194570 A1 | 8/2007 | Crouse | |
| 2011/0304138 A1 | 12/2011 | Commoner | |
| 2015/0136778 A1 * | 5/2015 | Johnson | B65D 90/10 220/288 |

* cited by examiner

SUPPLEMENTAL LID FOR CONTAINMENT SUMP

CROSS-REFERENCE TO RELATED APPLICATIONS

Not Applicable

FEDERAL SPONSORSHIP

Not Applicable

JOINT RESEARCH AGREEMENT

Not Applicable

TECHNICAL FIELD

This invention pertains generally to lids or caps to enclose manways or access points to underground systems. This invention more particularly pertains to an apparatus that seals off an opening with an inflatable seal, wherein the inflation mechanism is self-contained within the apparatus. By way of example, the apparatus may seal off and restricts water penetration into the interior of a containment sump from a secondary access point.

BACKGROUND

Generally, containment sumps, underground storage tanks, sanitary sewers and other underground systems are buried below the frost line of the terrain surrounding the underground system. Access to these underground systems is oftentimes achieved through an opening or access point at ground level. These openings or access points may be large enough to provide physical access or entry into the system and a cover may be utilized to enclose or block access to the opening. Further, a cover support frame on which the cover rests defines the diameter or width of the opening or access point.

Below the grade or ground level a secondary access point may be constructed and a lid or secondary cover may be utilized to further confine access into the underground system. At times, it is desirable to reduce or eliminate water or other debris from flowing or infiltrating into the underground system. Although a cover may restrict the flow of water or debris into the underground system, water and other liquids tend to find the paths of least resistance and may find their way into the underground system. Further, many freeze/thaw cycles, erosion, or other influences may shift a cover on the support frame or otherwise create a path for liquids to leak into the system. Also, the expansions and contractions of the system may further compromise the system.

Prior devices have been described that attempt to create a secondary access point into the underground system, however these devices may allow liquids to penetrate into the underground system. No known prior device describes a cover for a secondary access point that includes an inflatable seal and that further contains the inflation mechanism within the lid itself.

SUMMARY

Embodiments according to aspects of the invention include an apparatus for restricting water penetration into the interior of an underground system. The apparatus of the invention includes a cylindrical lid, an expandable pneumatic seal, a pressurized air tank and an air flow regulator. The lid includes concentric top and bottom plates and an annular collar extending between the top and bottom plates. Spaced apart flanges extend outwardly from the collar and are adapted to contain the expandable pneumatic seal between the two flanges. The pressurized tank is contained within an interior of lid between the top and bottom plates and is coupled in fluid communication with the pneumatic expandable seal. The flow regulator is coupled in line between the pressurized tank and the pneumatic seal to control the amount and pressure of air delivered to the pneumatic seal.

Alternatively, according to aspects of the invention, the apparatus may include an inflation control in fluid communication with the pressurized tank and pneumatic expandable seal to control flow of air into the pneumatic seal. At least a portion of the inflation control may be positioned on an exterior of the top plate. Similarly, the lid may also include a discharge control in fluid communication with the pressurized tank and the pneumatic seal to control flow of air out of the pneumatic seal and thereby deflate the seal. At least a portion of the discharge control is positioned on an exterior of the top plate.

In accordance with an aspect of the invention the lid may be adapted to engage a containment sump secondary access opening. The access opening may include a concentric outer rim, an inner ledge, and an annular sleeve extending upward between the outer rim and inner ledge. The supplemental lid is dimensioned so that the pneumatic seal of the lid engages an inner surface of the sleeve when the secondary lid engages the inner ledge of the access opening. The pneumatic seal is constructed from a relatively pliable material and when inflated the seal conforms to the sleeve surface, creating a water tight seal between the lid and sump. The pressurized air tank may be utilized to provide a constant air pressure within the pneumatic seal. For example, as the ambient air temperature increases an addition amount of pressurized air may be delivered from the tank to the seal to maintain the pressure within the seal at a constant pressure.

In an embodiment of the invention the supplemental lid includes a cylindrical body having a concentric opening extending from a bottom of the cylindrical body into a central portion of the lid. An inflatable seal is contained about an outer side of the cylindrical lid body and the bottom of the lid is adaptable to engage a ledge of an access port. Further, the seal is adapted to engage an inner side surface of the access port to thereby create a water tight barrier restricting water from penetrating into an interior of the underground duct. Spaced apart flanges extend outwardly from an outer cylindrical sidewall of the cylindrical lid body, wherein the inflatable seal is contained between the flanges. A pressurized tank and flow regulator may be contained within the central portion of the cylindrical lid, wherein the flow regulator is coupled in fluid communication between the pressurized tank and the inflatable seal to control the fluid delivered to the inflatable seal. Further, the tank and flow regulator are accessible from the opening of the cylindrical lid.

Also described herein is an apparatus for restricting inflow of water through an upper portion of a secondary access port of an underground duct. The apparatus includes a secondary lid having concentric top and bottom plates and an annular collar extending between the top and bottom plates. The annular collar includes spaced apart flanges extending outwardly from said collar. An expandable pneumatic seal is positioned and contained between the spaced apart flanges. A pressurized tank is enclosed within the secondary lid and is coupled in fluid communication with the pneumatic seal to deliver an "at will" supply of pressurized air to pneumatic seal. A flow regulator coupled is coupled in line between the pressurized tank and the pneumatic seal to control the air delivered to the pneumatic seal. Inflation valve control and deflation valve control are provided in fluid communication with the pressurized tank and the pneumatic seal to further control the flow of air into and out of the pneumatic seal. A portion of a pressure gauge may be mounted to an external top of the lid and coupled in line between the regulator and the pneumatic seal to indicate the air pressure within the pneumatic seal In use, and by way of example without limitation intended, a user may position the lid at an opening of a containment sump. The secondary lid is shaped to conform to the opening of the containment sump and is adapted to engage a containment sump secondary access opening, wherein the access opening has a concentric outer rim and inner ledge and an annular sleeve extending upward between the outer rim and the inner ledge. The inflatable or pneumatic seal of the lid engages an inner surface of the sleeve when the secondary lid engages the inner ledge of the access opening. Once in position the user depresses the inflation valve control to open the valve and deliver air from pressurized tank into the inflatable seal. The user may continue to depress the inflation valve until the desired air pressure within the pneumatic seal is indicated on the external pressure gauge. Alternatively, an internal flow control may be coupled in line with the pressurized air so that when the inflation valve control is activated, air is delivered from the tank pressurized until the preset or desired internal air pressure within the inflatable seal is reached. When removing the lid the user depresses the deflation control valve to release the air and pressure within the inflatable seal. Once the seal is deflated the user may pull up on the lid and remove the lid from the containment sump secondary access opening. Those skilled in the art will appreciate that the sealable lid of the present invention may be adapted for use in other systems that may benefit from use of a lid having an inflatable seal and pressurized air delivery system incorporated into the lid.

The accompanying drawings, which are incorporated in and constitute a portion of this specification, illustrate embodiments of the invention and, together with the detailed description, serve to further explain the invention. The embodiments illustrated herein are presently preferred; however, it should be understood, that the invention is not limited to the precise arrangements and instrumentalities shown. For a fuller understanding of the nature and advantages of the invention, reference should be made to the detailed description in conjunction with the accompanying drawings.

DESCRIPTION OF THE DRAWINGS

In the various figures, which are not necessarily drawn to scale, like numerals throughout the figures identify substantially similar components.

DETAILED DESCRIPTION

Figure 1:
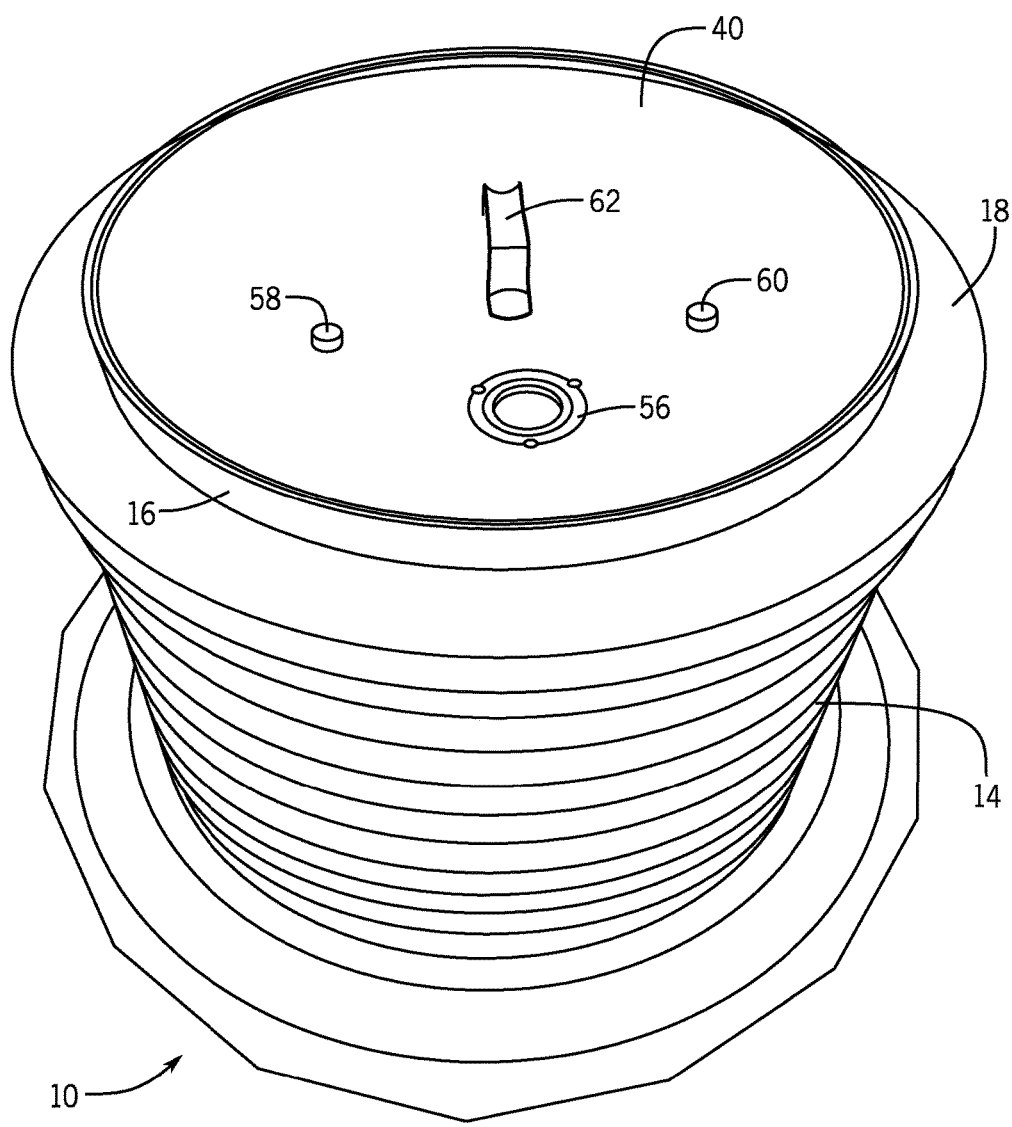
FIG. 1 is a partial sectional away perspective view of a containment sump and secondary lid in accordance with an embodiment of the invention.

The following description provides detail of various embodiments of the invention, one or more examples of which are set forth below. Each of these embodiments are provided by way of explanation of the invention, and not intended to be an undue limitation of the invention. Further, those skilled in the art will appreciate that various modifications and variations may be made in the present invention without departing from the scope or spirit of the invention. By way of example, those skilled in the art will recognize that features illustrated or described as part of one embodiment, may be used in another embodiment to yield a still further embodiment. Thus, it is intended that the present invention also cover such modifications and variations that come within the scope of the appended claims and their equivalents.

The secondary containment system 10 of the present invention restricts flow of liquid into an underground system. For purposes of describing the invention, and without limitation intended, the underground system will be described in the context of underground storage tanks and containment sumps coupled to the underground storage tank. The secondary containment system 10 includes a containment sump 14, sump cover support frame 16, and secondary lid 40. The support frame 16 and lid 40 cooperate together to create a barrier that restricts water from penetrating into the interior of an underground system. The lid 40 includes an inflatable seal 90, a pressurized tank 70, flow regulator 72 and inflation and deflation control valves 58 and 60. The control valves 58 and 60 may be of known suitable construction which may hand operated or solenoid driven. Further, the valve may be interconnected with a handle (external to the lid) such that the direction of rotation of the handle actuates one or more the valves (internal to the lid). Also, those skilled in the art will appreciate that additional check valves and regulators may be couple to the inflation pneumatics of the system to allow further control of the pressure within the inflatable seal.

Figure 2:
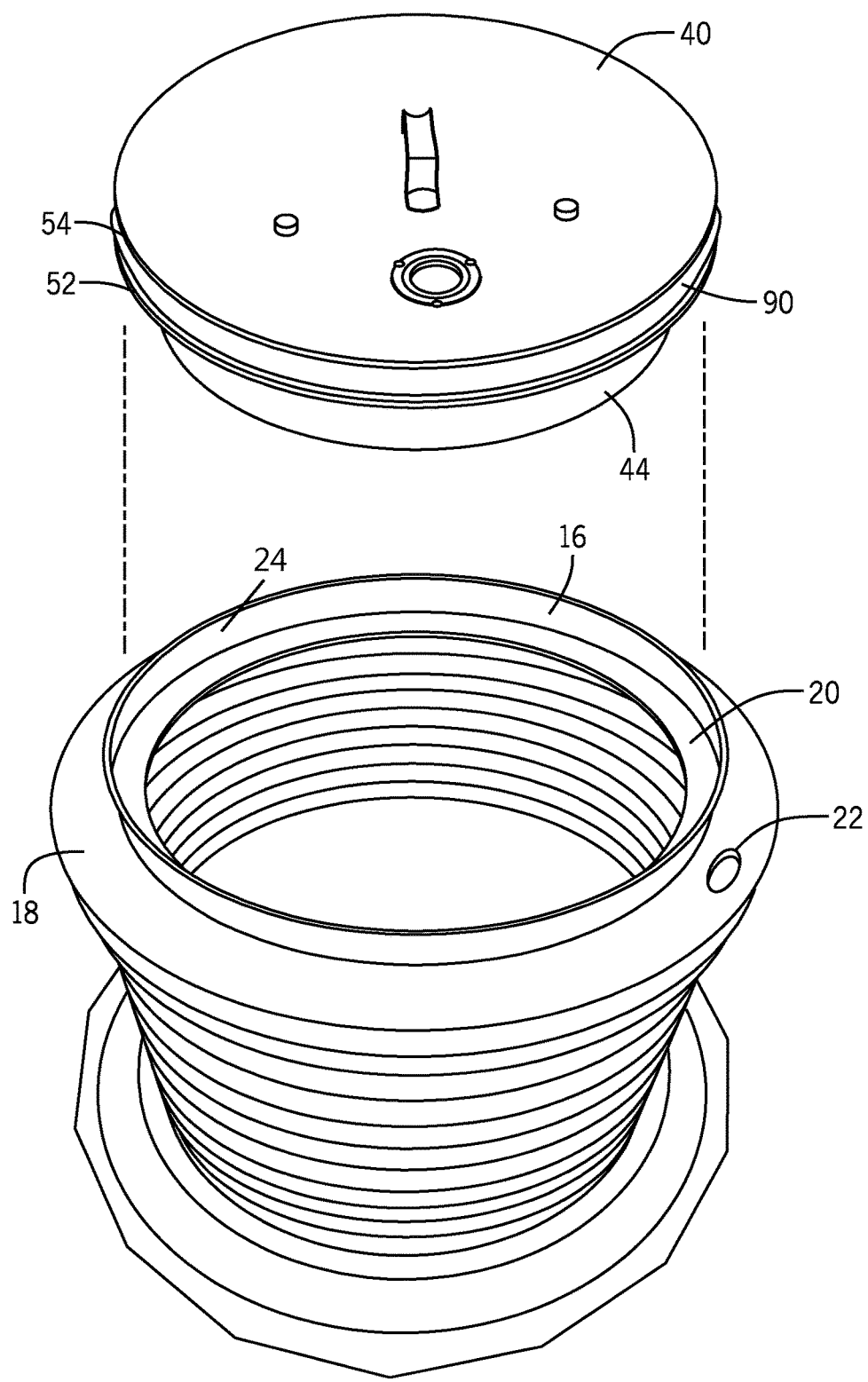
FIG. 2 is a partial sectional perspective view of the containment sump and supplemental lid of the type shown in FIG. 1 illustrating the lid elevated above the sump.
Figure 3:
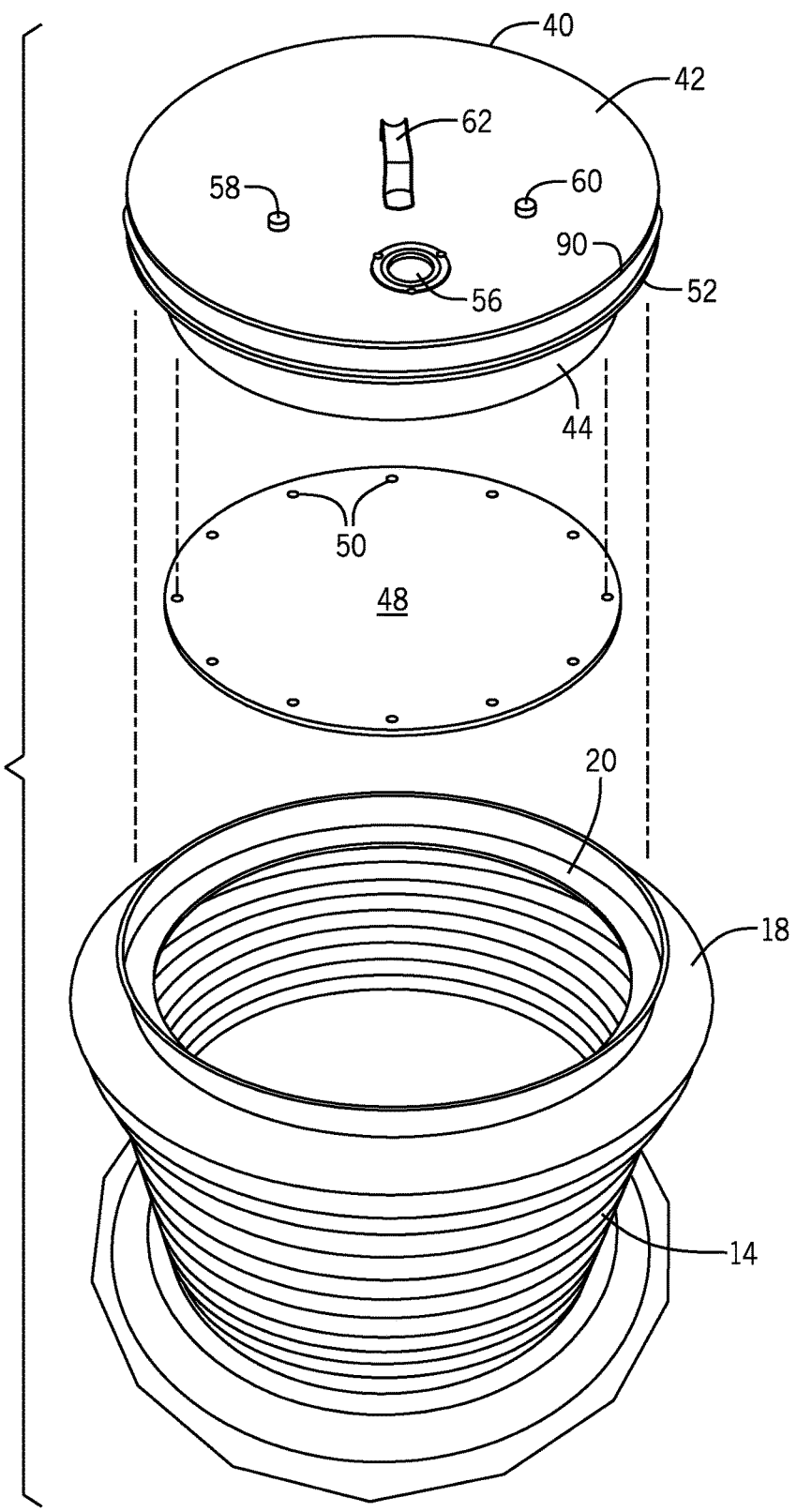
FIG. 3 is a partial sectional perspective view of the containment sump and supplemental lid of the type shown in FIG. 1 illustrating the lid elevated above the sump and a bottom plate removed from the lid.

Turning attention now to the Figures, embodiments of the apparatus for restricting flow and infiltration into an underground system of the present invention will now be described in more detail. The support frame 16 includes an annular rim 18, annular sleeve 24 and inner ledge 20 on which the lid 40 rests. A relief valve 22 may be coupled to the support frame to allow release of internal pressure within the containment sump 14. The containment sump 14 and supplemental lid 40 are generally shown in FIGS. 1-3. The lid 40 generally includes a top plate 42, collar 44, bottom plate 48, upper and lower spaced apart flanges 52 and 54, pressure gauge 56, inflation control valve 58, deflation control valve 60, and handle 62.

Bolt holes 50 extend through the bottom plate 48 and are arranged on the bottom plate to securely bolt the bottom plate 48 to a bottom rim 46 extending inward from the collar 44. The diameter of the supplemental lid 40 and support frame 16 are typically sized to allow passage there through by a user carrying an oxygen tank or other backpack and supplies. Municipalities or cities often times will specify the minimum requirements for this opening. The lid 40 may be made of a suitable construction and, by way of example, may preferably be made from a steel or cast iron.

Figure 4:
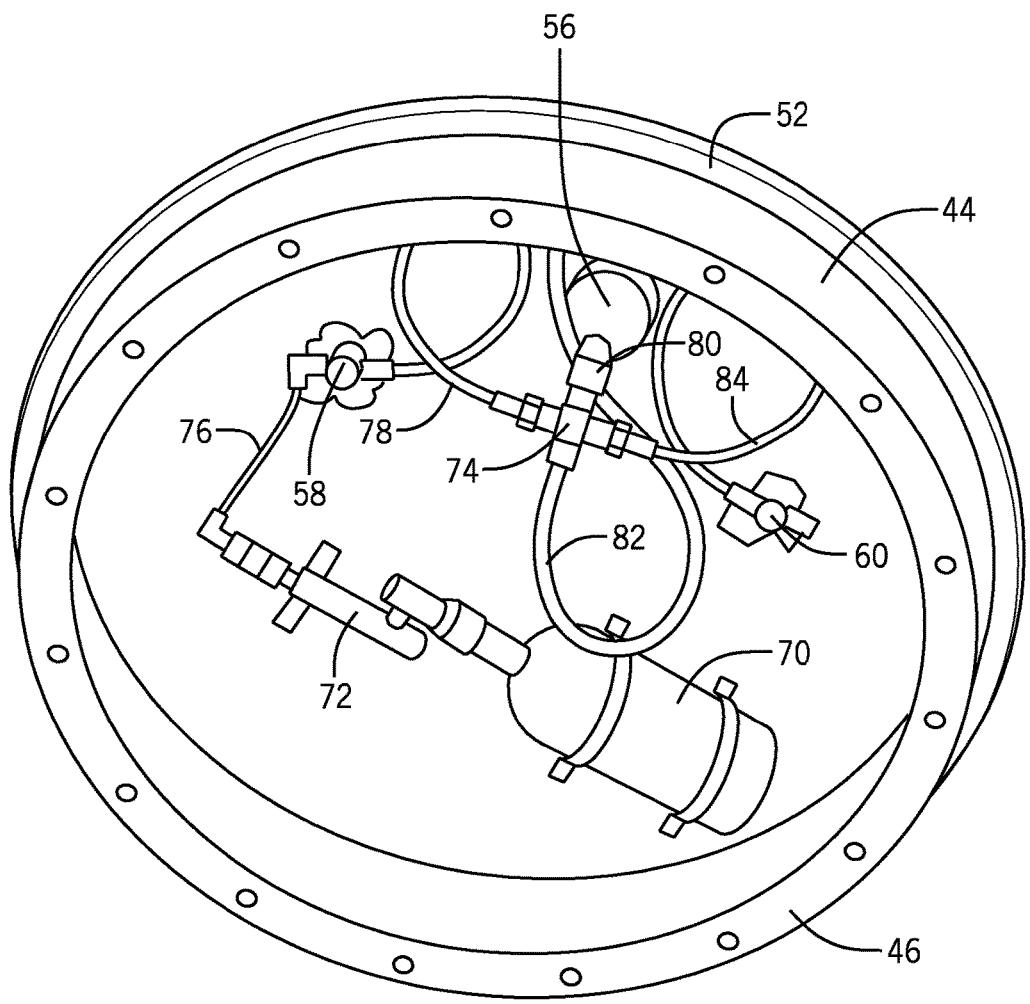
FIG. 4 is a bottom perspective view of the supplemental lid in accordance with the present invention and having a bottom plate removed to illustrate the interior space of the lid.
Figure 5:
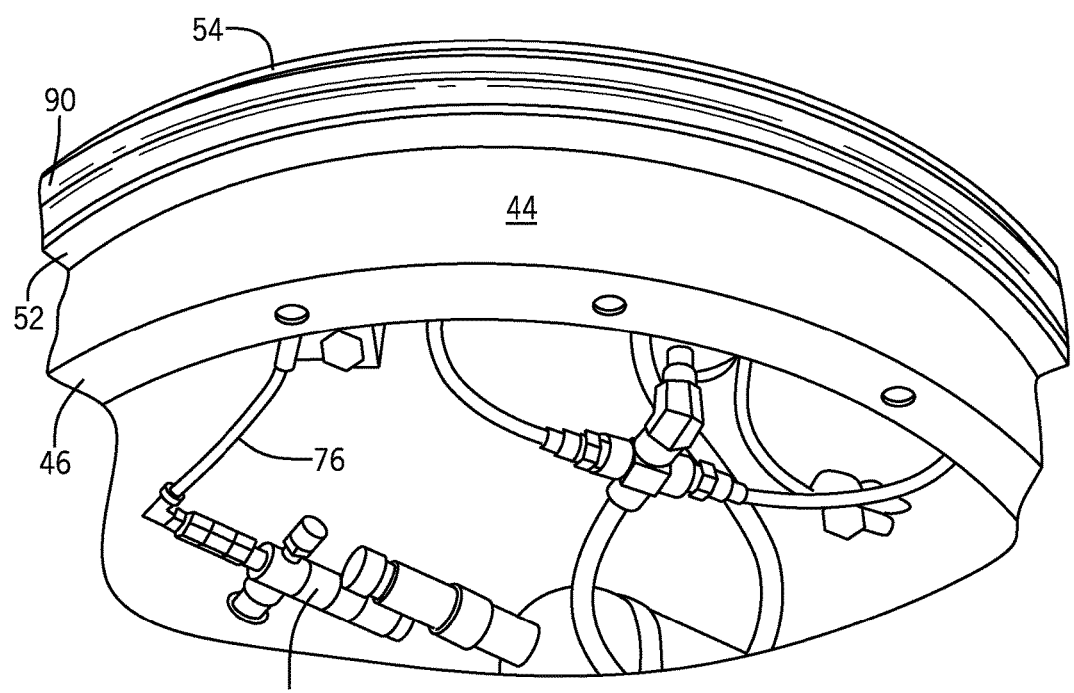
FIG. 5 is a bottom sectional perspective view of a portion of the supplemental lid in accordance with an embodiment of the present invention.

FIGS. 4-5 show generally an interior of the supplemental lid 40. Pressurized tank 70 and portions of the inflation valve 58, discharge valve 60 and pressure gauge 56 are secured within an interior of the lid 40. Pressure regulator 72 is coupled in line with the pressurized air tank 70. Air hose 76 interconnects pressure regulator 72 in fluid communication with inflation valve 58. Air hose 78 interconnects inflation valve 58 in fluid communication with a 4 way junction 74. Air fitting 80 interconnects 4 way junction 74 in fluid communication with pressure gauge 56. Air hose 82 interconnects 4 way junction 74 with the valve stem 92 of the inflatable seal 90. Air hose 84 interconnects deflation or discharge valve 60 in fluid communication with a 4 way junction 74. In this manner, a user may deliver pressurized air to the inflatable seal without removing the lid from the support frame 16. Without limitation intended, an internal pressure ranging between 3-15 psi has been found sufficient to engage the seal 90 to an inner side of annular sleeve 24 with enough force against the sleeve to reduce the likelihood that the lid is removed without first deflating the seal. Further, those skilled in the art will appreciate that the pressure within inflatable seal may be varied to compensate for changes in the environmental temperature surrounding the lid.

Figure 6:
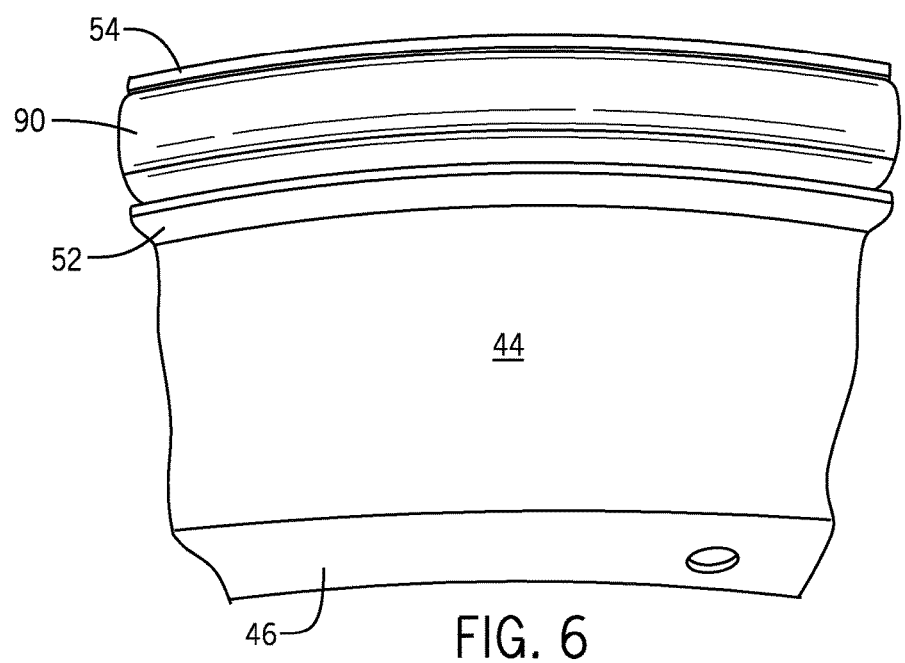
FIG. 6 is a side sectional perspective view of a portion of the lid in accordance with an embodiment of the present invention and illustrating the inflatable seal and seal retaining flange in greater detail.
Figure 7:
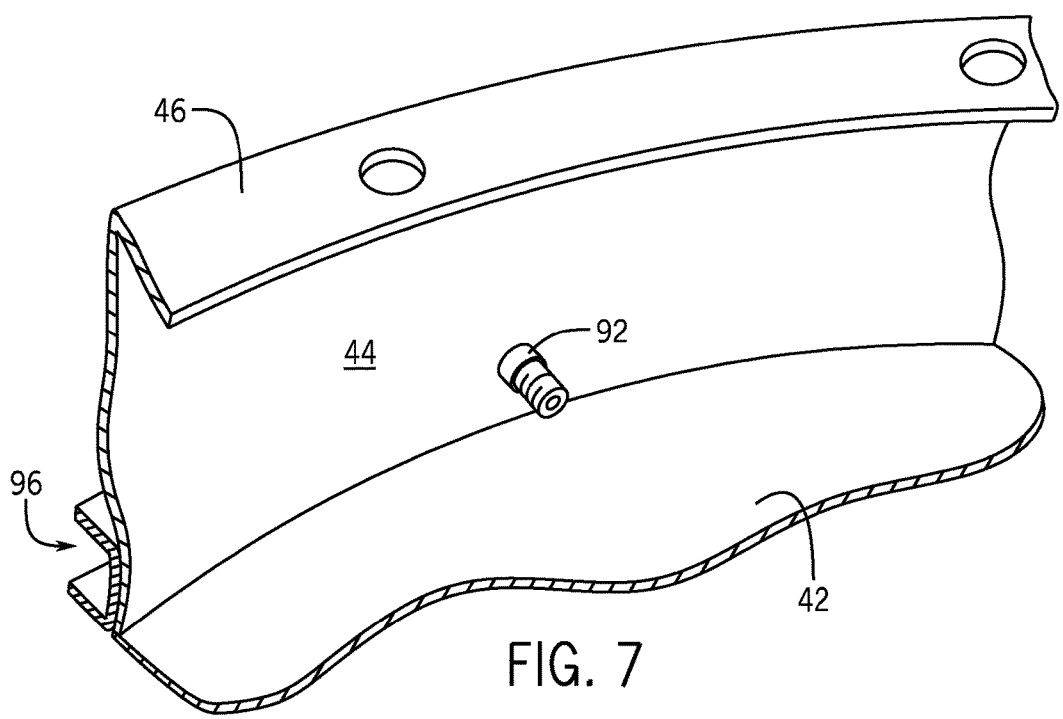
FIG. 7 is a partial sectional interior perspective view of a the lid in accordance with an embodiment of the present invention and illustrating an inflation valve of the inflatable seal.
Figure 8:
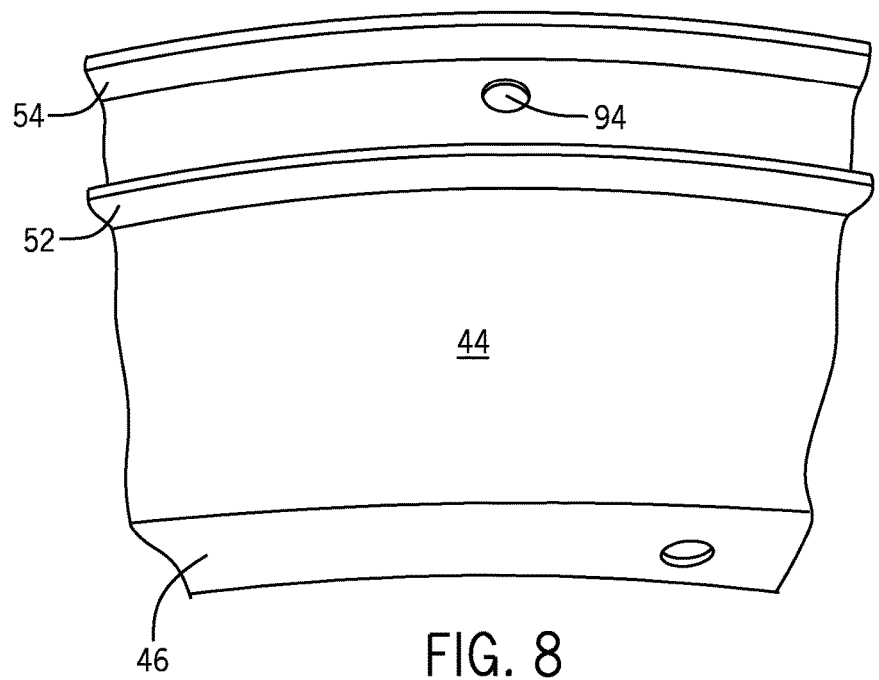
FIG. 8 is a partial sectional exterior side perspective view of the lid in accordance with an embodiment of the present invention and illustrating the seal retaining flanges.

With reference to FIGS. 6-8 the inflatable seal 90 will be further described. The inflatable seal 90 is preferably made of an expandable polymer or rubber. The seal 90 includes a hollow internal airway or central section to which air may delivered. As the air pressure within the internal airway increases the seal tends to expand and as the air pressure decreases the internal airway tends to relax and contract. Valve stem 92 provides an air passageway into the hollow internal airway. An aperture or hole 94 extends through the collar 44 and between the upper and lower flanges 52 and 54. The valve stem 92 extends through aperture 94 and couples to an end of hose 82. The inner space between the upper and lower flanges 52 and 54 forms seal retaining groove 96.

In use, the lid 40 may be engaged with the support frame 16 of the containment sump 14. The inflatable seal 90 of the lid 40 engages the inner surface of the annular sleeve 24 when the secondary lid engages the inner ledge 20 of the access opening. Once the lid 40 is engaged with the support frame 16, the user may depress the inflation valve control 58 to open the valve and deliver air from pressurized tank 70 into the inflatable seal 90. The user may continue to depress the inflation valve 58 until the desired air pressure within the pneumatic seal 90 is indicated on the external pressure gauge 56. When removing the lid 40, the user depresses the discharge or deflation control valve 60 to release the air and pressure within the inflatable seal 90. Once the seal 90 is deflated the user may pull up on the handle 62 and remove the lid 40 from the containment sump secondary access opening or frame 16.

These and various other aspects and features of the invention are described with the intent to be illustrative, and not restrictive. This invention has been described herein with detail in order to comply with the patent statutes and to provide those skilled in the art with information needed to apply the novel principles and to construct and use such specialized components as are required. It is to be understood, however, that the invention can be carried out by specifically different constructions, and that various modifications, both as to the construction and operating procedures, can be accomplished without departing from the scope of the invention. Further, in the appended claims, the transitional terms comprising and including are used in the open ended sense in that elements in addition to those enumerated may also be present. Other examples will be apparent to those of skill in the art upon reviewing this document.

What is claimed is:

1. A secondary lid that restricts inflow of fluids into an interior of a containment sump of an underground storage tank, said containment sump having a secondary access opening having a concentric outer rim, an inner ledge and an annular sleeve extending upward between said outer rim and said inner ledge, said secondary lid comprising:
   concentric top and bottom plates and an annular collar extending between the top and bottom plates, wherein an outer edge of the bottom plate contacts the ledge of said secondary access opening of said containment sump;
   first and second spaced apart flanges extending outwardly from said collar approximately parallel with respect to each other;
   an expandable pneumatic seal positioned between said first and second spaced apart flanges, wherein when the seal is expanded the seal is in sealing contact with both said flanges, said annular collar of said lid, and said annular sleeve of said secondary access opening of said containment sump;
   a pressurized tank contained between said top and bottom plates and coupled in fluid communication with said pneumatic seal; and
   a flow regulator coupled in line between said pressurized tank and said pneumatic seal to control the air delivered to the pneumatic seal.

2. The secondary lid as recited in claim 1 further including an inflation control in fluid communication with said pressurized tank and said pneumatic seal to control flow of air into said pneumatic seal.

3. The secondary lid as recited in claim 2, wherein at least a portion of said inflation control is positioned on an exterior of said top plate.

4. The secondary lid as recited in claim 1 further including a discharge control in fluid communication with said pressurized tank and said pneumatic seal to control flow of air out of said pneumatic seal.

5. The secondary lid as recited in claim 4, wherein at least a portion of said discharge control is positioned on an exterior of said top plate.

6. The secondary lid as recited in claim 1, wherein said bottom plate is removable from said annular collar.

7. The secondary lid as recited in claim 1, wherein said pneumatic seal is constructed from a relatively pliable material and wherein said top plate, bottom plate, and annular collar are constructed of a relatively rigid material.

8. A device for restricting water penetration through an upper portion of a secondary access port of an underground duct, said device comprising:
- a cylindrical lid having a concentric opening extending from a bottom of said lid into a central portion of said lid;
- an inflatable seal contained about an outer side of said cylindrical lid; and
- wherein the bottom of said lid being adaptable to engage a recessed ledge of an access port, and further wherein said seal is adapted to engage an inner side surface of the access port and said outer side of said cylindrical lid to thereby create a water tight barrier above said recessed ledge restricting water from penetrating into an interior of the underground duct.

9. The device as recited in claim 8, further including first and second spaced apart flanges extending in parallel and outwardly from an outer cylindrical sidewall of said lid, wherein said inflatable seal is contained between said flanges.

10. The device as recited in claim 8, further including a pressurized tank and flow regulator contained within the central portion of said cylindrical lid, wherein said flow regulator is coupled in fluid communication between said pressurized tank and said inflatable seal to control the fluid delivered to the inflatable seal, and further wherein said tank and flow regulator are accessible from said opening of said cylindrical lid.

11. The device as recited in claim 8 further including an inflation valve control in fluid communication with said pressurized tank and said inflatable seal to control flow of air into said inflatable seal, wherein at least a portion of said inflation valve control is positioned on an exterior of said cylindrical lid.

12. The device as recited in claim 8 further including a discharge valve control in fluid communication with said pressurized tank and said inflatable seal to control flow of air out of said inflatable seal, wherein at least a portion of said discharge valve control is positioned on an exterior of said top plate.

13. The device as recited in claim 8, wherein said cylindrical lid is adapted to engage a containment sump secondary access opening having a concentric outer rim and inner ledge and an annular sleeve extending upward between said outer rim and said inner ledge, such that said inflatable seal engages an inner surface of said sleeve when said lid engages said inner ledge of said access opening.

14. The device as recited in claim 8, further including a removable bottom plate aligned in said opening and adapted to enclose the central portion on said lid.

15. A secondary lid that restricts inflow of water through an upper portion of a secondary access port of an underground duct, said secondary lid comprising:
- concentric top and bottom plates and an annular collar extending between the top and bottom plates;
- first and second spaced apart flanges extending outwardly from said collar;
- an expandable pneumatic seal positioned between said first and second spaced apart flanges;
- a removeable pressurized tank contained between said top and bottom plates and coupled in fluid communication with said pneumatic seal;
- a flow regulator coupled in line between said pressurized tank and said pneumatic seal to control the air delivered to the pneumatic seal;
- an inflation valve control in fluid communication with said pressurized tank and said pneumatic seal to control flow of air into said pneumatic seal; and
- a discharge valve control in fluid communication with said pressurized tank and said pneumatic seal to control flow of air out of said pneumatic seal; and
- wherein said secondary lid is adapted to engage a containment sump secondary access opening having a concentric outer rim and inner ledge and an annular sleeve extending upward between said outer rim and said inner ledge, such that said pneumatic seal engages an inner surface of said sleeve, inner sides of said first and second spaced apart flanges, and said collar when a bottom of said secondary lid engages said inner ledge of said access opening.

16. The secondary lid as recited in claim 15, wherein at least a portion of said inflation valve control is positioned on an exterior of said top plate.

17. The secondary lid as recited in claim 15, wherein at least a portion of said discharge valve control is positioned on an exterior of said top plate.

18. The secondary lid as recited in claim 15, further including a pressure gauge coupled in line between said regulator and said pneumatic seal, at least a portion of said pressure gauge positioned on an exterior of said plate.

* * * * *